(12) United States Patent
Ahmed et al.

(10) Patent No.: US 11,942,871 B2
(45) Date of Patent: Mar. 26, 2024

(54) STARTUP OF SECONDARY CONTROLLER FOR PRIMARY CONTROLLER POWERED FROM AC LINE

(71) Applicant: Cypress Semiconductor Corporation, San Jose, CA (US)

(72) Inventors: Rashed Ahmed, Fremont, CA (US); Pavan Kumar Kuchipudi, San Jose, CA (US); Myeongseok Lee, Campbell, CA (US); Murtuza Lilamwala, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 659 days.

(21) Appl. No.: 17/127,523

(22) Filed: Dec. 18, 2020

(65) Prior Publication Data

US 2022/0200476 A1    Jun. 23, 2022

(51) Int. Cl.
| | | |
|---|---|---|
| H02J 7/00 | (2006.01) | |
| G06F 1/26 | (2006.01) | |
| G06F 13/42 | (2006.01) | |
| H02M 7/219 | (2006.01) | |

(52) U.S. Cl.
CPC ............ *H02M 7/219* (2013.01); *G06F 1/266* (2013.01); *G06F 13/4282* (2013.01); *H02J 7/0042* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 2005/0151524 A1* | 7/2005 | Sae-Ueng | H02M 3/28 323/282 |
| 2009/0121684 A1* | 5/2009 | Hussain | H02J 7/00711 320/139 |
| 2019/0222116 A1* | 7/2019 | Manthe | H02M 1/40 |

* cited by examiner

*Primary Examiner* — Arun C Williams (57) ABSTRACT

A system includes a transformer, a first controller, a discharge circuit to discharge an external capacitor based on an undervoltage threshold, and a second controller. The second controller is coupled to the discharge circuit, and is also coupled to receive a rectified Ac voltage and to receive control signals from the first controller. The second controller includes a gate driver to turn on a primary field effect transistor (FET). The second controller also includes a startup controller coupled to the gate driver. The startup controller is configured to increase a duty cycle of the primary FET based on whether a control signal is received from the first controller. The startup controller is also configured to determine a current duty cycle of the primary FET and to turn off the primary FET based on whether the voltage of the AC-DC converter is above an undervoltage threshold.

20 Claims, 4 Drawing Sheets

STARTUP OF SECONDARY CONTROLLER FOR PRIMARY CONTROLLER POWERED FROM AC LINE

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Alternating current to direct current (AC-DC) converters convert power from an alternating current (AC) source to a direct current (DC) at a specified voltage level. These AC-DC converters can be adapted to include USB-PD control that enables manufacturers to build a reliable, efficient, and cost-effective power adapters for a growing USB type-C charger market.

BRIEF DESCRIPTION OF THE DRAWINGS

The disclosure is illustrated by way of example, and not of limitation, in the figures of the accompanying drawings.

DETAILED DESCRIPTION

The following description sets forth numerous specific details such as examples of specific systems, components, methods, and so forth, in order to provide a good understanding of various embodiments of the techniques described herein for performing startup of an alternating current to direct current (AC-DC) converter using a self-biased gate driver architecture within a primary controller of the AC-DC converter. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the scope of the present disclosure.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of techniques for performing startup of an AC-DC converter using a self-biased gate driver architecture within a primary controller of the AC-DC converter. For example, a primary field effect transistor (FET) can be coupled between a primary winding on a primary side of the AC-DC converter and the primary side controller. A gate driver, also of the primary side controller, is coupled to a gate of the primary FET to turn on, in response to a signal received from a startup controller of the primary side controller, the primary FET at startup when the secondary side is not active. Thus, the startup controller and the gate driver work together to initiate the AC-DC converter, along with a number of other functions performed by the primary side controller.

Figure 1:
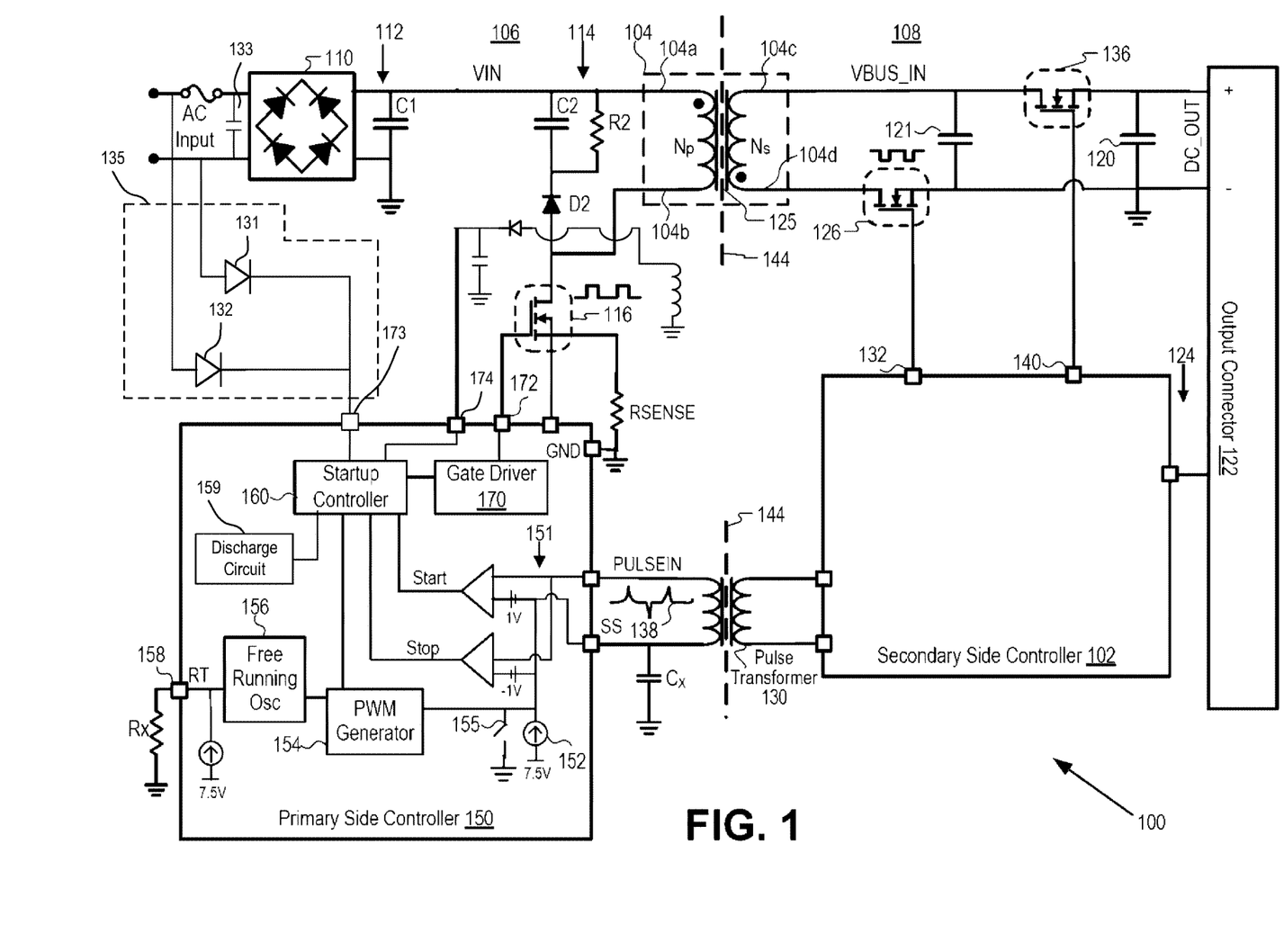
FIG. 1 is a schematic block diagram of an AC-DC converter in which a primary side controller reacts to a signal from a secondary side during startup according to various embodiments.

In conventional primary side controllers with a discharge circuit (e.g., an X-cap discharge circuit), gate drivers, internal regulator powers the gate drive circuit with an external capacitor used to store charge. The charge is used to power the gate drivers when external line voltage source is unable to provide power when voltage goes below undervoltage threshold. Gate drive circuit is initiated during the first positive going ramp of AC input voltage. For a traditional primary side controller, startup happens in less than 4 ms. For nominal AC input, the full wave rectified voltage period of 120 Hz or 100 Hz signal is 10 ms or 8 ms respectively. For a secondary side controller, it can take the secondary side controller in the order of 30~50 ms for a proper startup. Secondary side controller includes an MCU and/or any smart peripherals or auxiliary circuits. During this time of 30~50 ms, the rectified input AC voltage received via the high voltage (HV) pin 173 can fall below the threshold voltage. When the rectified input voltage (e.g., a rectified AC voltage) at HV pin 173 drops below threshold voltage, primary side controller 150 is not powered using HV pin 173. Input voltage can be below threshold voltage for 3~4 ms. C3 would need to be too large to store energy to supply primary side controller 150 for 3~4 ms. Also, energy stored in C3 needs to supply power to the primary side controller 150 for a total cumulative time of 30~40 ms, time taken by secondary side controller 102 to boot up. Larger C3 would also cause startup delay and take up board space. A better solution is to not switch during this period and only switch when input voltage exceeds threshold voltage. In another embodiment, during the period when there is no switching at startup, duty cycle is stalled and picks up from the previous saved state. During initial start-up, AC-DC converter goes through a soft start where duty cycle may start at 1% or 5% which is defined by the system. During startup duty cycle increases incrementally until it reaches a maximum duty cycle. This description is known as startup. If the duty cycle is allowed to increase incrementally when there is no GD 172 activity, the next time GD turns ON after a period of no switching will cause unneeded stress on primary switch 116 and Bridge rectifier 110 due to the sudden turn ON at an increased duty cycle.

FIG. 1 is a schematic block diagram of an AC-DC converter 100 in which a primary side controller 150 reacts to a signals from a secondary side during startup according to various embodiments. In various embodiments, the AC-DC converter 100 is an apparatus or part of an electronic device that includes charging capability, such as, for example, laptop power supplies, a multi-outlet power strip, wall sockets with USB-PD type-C sockets, and the like. In some embodiments, the AC-DC converter 100 includes a transformer 104 having a primary winding ($N_P$) on a primary side 106 electrically connected or coupled to an AC input, and a secondary winding ($N_S$) on a secondary side 108 coupled to a DC output. Other devices that include AC-DC topologies, such as full-bridge converter, half-bridge converter, forward converter, and the like, are to be considered within the meaning of the term AC-DC converter as used herein.

In various embodiments, on the primary side 106, a rectifying circuit, such as a bridge rectifier 110, and one or more input filters 112, 114, is coupled to a first terminal 104a of the transformer 104 to rectify an AC input voltage and supply input power to the primary winding of the transformer 104. The input filters can include a first input filter 112 having a capacitor (C1) coupled to or across an output of the rectifier 110, and a second, RC filter 114 including a resistor or resistive element (R2) and a capacitor (C2) coupled in parallel between the first terminal 104a of the transformer 104 and a cathode of a diode or rectifier (D2) having an anode coupled to a second terminal 104b of the transformer.

In some embodiments, the AC-DC converter 100 further includes a power switch (e.g., a field effect transistor (FET), a gallium nitride (GaN) switch, silicon carbide (SiC) switch, a bipolar junction transistor (BJT), and the like), such as a primary field effect transistor (FET) 116 having a first or drain node coupled to the second terminal 104b of the transformer 104, a second or gate node coupled to the primary side controller 150, and a third or source node coupled to the primary side controller 150 and, through a current sensing element, such as a resistive element ($R_{SENSE}$) to ground to sense a primary side current flowing through the primary winding when the primary FET 116 is closed or conducting.

On the secondary side 108, the AC-DC converter 100 includes a output capacitor 121 coupled between a third terminal 104c of the transformer 104 and an electrical ground or ground terminal, and an filter capacitor 120 coupled between a source terminal of the FET 136 and an electrical ground provide a DC output voltage to an output interface or connector 122. The output connector 122 can further be coupled to the secondary side controller 102 through a number of communication channels 124 to support various charging protocols. Suitable output connectors 122 can include those compatible with and supporting standard and proprietary charging protocols including Universal Serial Bus Power Delivery USB PD2.0 and USB PD3 with Programmable Power Supply (PPS), Qualcomm® Quick Charge, Samsung® AFC, and Apple® charging protocols. For example, the connector can include a Universal Serial Bus type C (USB-C) compatible connector where the AC-DC converter 100 is compliant with the USB PD protocol to provide a DC output voltage of about 3.3 VDC to about 21.5 VDC at an output current of about 0 to about 5000 milliamps (mA).

In various embodiments, the AC-DC converter 100 further includes, on the secondary side 108, a synchronous rectifier such as a synchronous rectifier (SR) FET 126, coupled between a fourth terminal 104d of the transformer 104 and the ground terminal of the DC output. The SR FET 126 includes a first or drain node coupled to the fourth terminal 104d of the transformer 104 and the secondary side controller 102 to sense a voltage on the drain of the SR FET 126; a second or gate node coupled to the secondary side controller to drive or control the SR FET 126; and a third or source node coupled to the secondary side controller and the ground terminal of the DC output. The gate node of the SR FET 126 can be coupled to an SR-drive pin 132 of the secondary side controller 102.

Optionally, as in the embodiment shown, the secondary side further includes an additional or secondary switch 136, such as a NFET, coupled between the third terminal 104c of the transformer 104 and a positive DC output to enable the secondary side controller 102 to turn off the DC output to protect against over voltage and/or under voltage conditions. The secondary switch 136 includes a drain node coupled to a voltage bus ($V_{BUS\_IN}$) of the secondary side controller 102; a gate node coupled to a voltage bus control pin ($V_{BUS\_CTRL}$) 140 to drive the additional secondary switch; and a source node coupled to a voltage bus ($V_{BUS\_OUT}$) and to the positive terminal of the DC output. (Not all pins illustrated.)

In various embodiments, the AC-DC converter 100 further includes an isolation circuit or galvanic isolation barrier 144 to electrically isolate the secondary side 108 from the high AC input voltage present on the primary side 106. The transformer 104 is generally considered part of the galvanic isolation barrier 144. For example, the galvanic isolation barrier 144 can include various coils and magnetic core 125 of the transformer 104, which functions as a flyback step-down transformer to provide power to the primary side controller 150 via an auxiliary winding coupled to aux (or "Aux") pin (not illustrated). Further, the secondary side controller 102 may provide a signal to the primary side controller 150 from pins on the secondary side controller 102, such as a feedback pin or pulse width modulation (PWM) drive pin (not illustrated). The galvanic isolation barrier 144 can further include additional circuits or elements between the secondary side controller 102 and the primary side controller 150 or the primary FET 116.

In corresponding embodiments, when the primary side power switch (e.g., the primary FET 116) is closed, the primary side 106 of the flyback transformer is connected to the input voltage source. In this embodiment, the primary side 106 of the flyback transformer is coupled to the bridge rectifier 110. As the primary current in the flyback transformer increases, energy is stored in the transformer magnetic field of the flyback transformer. The voltage induced in the secondary winding is negative and blocked by the secondary side power switch (e.g., the SR FET 126). When the primary FET 116 (e.g., switch) is opened, the primary current decreases. The secondary voltage is positive, allowing current to flow from the flyback transformer. The energy stored in the transformer 104 is transferred to an output load, such as a USB charging device. The output capacitor 120 can be used to supply energy to the output load when the primary FET 116 is engaged. Thus, the flyback transformer, based on control of the primary FET 116 (e.g., a switch), can store energy and transfer the energy to the output of the AC-DC converter 100.

The primary side controller 150 can be implemented as an integrated circuit (IC) that is included as a component within the AC_DC converter 100. The primary side controller 150 can be configured to receive a control (or pulse) signal 138 as one or more pulses, via a pulse transformer 130, from the secondary side controller 102 across the galvanic isolation barrier 144. The pulse signal 138 can be received through a PULSEIN pin. The primary side controller 150 can include a receiver 151 and a pulse width modulation (PWM) generator 154 to receive the pulse signal 138 from the secondary-side controller 150. The primary side controller 150 can further include a free running oscillator 156 that supplies free running pulses to the PWM generator 154, so that the PWM generator 154 can generate a free running PWM signal when the secondary side 108 is not active. The receiver 151 and PWM generator 154 can change the primary-side turn-on pulse based on output of the flyback transformer (e.g., error amplifier (EA) output) of the secondary side controller 102. The primary-side turn-on pulse can be used to turn on the primary FET 116 as will be explained.

In disclosed embodiments, the primary side controller 150 can also include a gate driver 170 and a startup controller 160. The startup controller 160 is coupled to the receiver 151, the PWM generator 154, and the gate driver 170 to drive a gate of the primary FET 116 via a gate driver pin 172. For example, the startup controller 160 can transmit a signal generated by the PWM generator 154 to the gate driver 170 to turn on the primary FET 116. In this way, the gate driver 170 can turn on the primary FET 116 when the secondary side 108 is not active.

In one embodiment, the primary side controller 150, in order to apply the pulse signal 138 to the primary side FET 116, is configured to receive a turn-on pulse from the secondary side controller 102. The startup controller 160 can apply the turn-on pulse to the gate of the primary FET 116 via the gate driver 170. The turn-on pulse causes the primary drain of the primary FET 116 to go low, e.g., a first voltage level corresponding to a first state or representing the digital value of one. Subsequently, the primary side controller 150 receives a turn-off pulse from the secondary side controller 102. The startup controller 160 can apply the turn-off pulse to the gate of the primary FET 116 via the gate driver 170. The turn-off pulse causes the primary drain of the primary FET 116 to go high, e.g., a second voltage level corresponding to a second state or representing the digital value of zero.

With additional specificity and further reference to the primary side controller 150, the PWM generator 154, with the use of the free running oscillator 156, supports a soft start of the primary side controller by gradually increasing the duty cycles from $D/C_{min}$ to $D/C_{max}$ using an external capacitor (Cx) connected to a soft start (SS) pin. The duration for the free running PWM generation can be set by the external capacitor (Cx). An internal, e.g., 5 microampere, current source 152 can charge the external capacitor (Cx). The PWM generator 154 can set a maximum amplitude for the soft start, e.g., between 3 and 4 volts (e.g., 3.75 V). A frequency ($F_{OSC}$) of the free running oscillator 156 can be set by an external resistor (Rx) of between 400 and 600 kilo-ohm (KΩ) (e.g., 500 KΩ) connected externally to a timing resistor (RT) pin 158. A discharge switch 155 can discharge the external capacitor (Cx) after startup is complete. This cycle can be repeated with an auto-restart timer added between each soft start.

Additionally, the primary side controller 150 can function to synchronize the secondary side pulses on the PULSEIN pin when the secondary side 108 becomes active. The PWM signal from the secondary side 108 can be coupled to the primary side using the pulse transformer 130. The pulse transformer 130 can ensure proper frequency response and should have just an adequate Q-factor to avoid excessive overshoot in passing the PWM signal. The positive pulse from the pulse transformer 130 indicates a start of the PWM signal and a negative pulse from the pulse transformer 130 indicates a stop of the PWM. A set of comparators in the receiver 151 can be adapted to detect whether an incoming pulse is positive or negative. This information (positive or negative on the incoming pulse) can be sent to the startup controller 160 for proper timing in enabling the gate driver 170 to drive the primary FET 116.

In some embodiments, the AC-DC converter 100 includes a full wave AC rectified circuit 135. The rectified circuit is coupled to the AC input and includes diode 131, diode 132, and capacitor 133. The rectification circuit 131 may be coupled to the primary side controller 150 via pin 175. In other embodiment, Primary side controller 150 includes a discharge circuit 159 that may cause capacitor 133 to be discharged internally in the primary side controller 150.

As discussed above, the primary side controller 150 may receive an AC-rectified voltage from the AC line which could be anywhere from 50Vac to 300Vac. In one embodiment, the startup controller 160 (and/or the primary side controller 150) may turn on the primary FET 116 in response to receiving voltage on HV pin 173 exceeding the threshold voltage. The startup controller may operate the primary switch 116 at an initial duty cycle. For example, the initial duty cycle may be 1%, 5%, or some other appropriate value and incrementally increases with time. Turning on the primary switch 116 at the initial duty cycle (e.g., the primary FET 116 operates at the initial duty cycle) allows the primary side controller 150 to start supplying voltage to the secondary side controller 102 during the soft start.

In one embodiment, the startup controller 160 (and/or the primary side controller 150) may determine whether the pulse signal 138 has been received from the secondary side controller 102 via the PULSEIN pin. The pulse signals 138 may also be referred to as a control signal. The pulse signal 138 may be used by the primary side controller 150 to operate the primary FET 116 at a particular duty cycle, based on the pulse signal 138, as discussed in more detail below. In some embodiments, the startup controller 160 may continually, periodically, etc., determine whether the pulse signal 138 has been received from the secondary side controller 102 via the PULSEIN pin. For example, the startup controller 160 may check the PULSEIN pin every 100 microseconds, every millisecond, or some other appropriate period of time, or may use an analog implementation.

In one embodiment, the startup controller 160 (and/or the primary side controller 150) may start a startup routine whereby to increase the duty cycle of the primary FET 116 when the pulse signal 138 has not been received from the secondary side controller 102. Increasing the duty cycle of the primary FET 116 may allow more voltage to be provided to the secondary side 108 as the secondary side controller 102 continues to start (e.g., starts operation, initiates operation, boots, etc.). The secondary side controller 102 may take some time (e.g., 30 ms to 50 ms, or some other time) to fully boot up. In some embodiments, the startup controller 160 may increase the duty cycle of the primary FET 116 by a set amount. For example, the startup controller 160 may increase the duty cycle of the primary FET 116 by 1%, 5%, or some other appropriate amount. In other embodiments, the startup controller 160 may increase the duty cycle of the primary FET 116 based on configuration parameters, settings, a table of duty cycles, etc. In some embodiments, the startup controller 160 may continually, periodically, etc., increase the duty cycle of the primary FET 116 until the pulse signal 138 is received from the secondary side controller 102. For example, each time the startup controller 160 checks for the pulse signal 138 and determines that the pulse signal 138 has not been received, the startup controller 160 may increase the duty cycle of the primary FET 116.

In one embodiment, the startup controller 160 may refrain, discontinue, stop, etc., increasing the duty cycle of the primary FET 116 if the pulse signal 138 is received from the secondary side controller 102. For example, if the pulse signal 138 is received from the secondary side controller 102 via the PULSEIN pin, this may indicate that the secondary side controller 102 has completed startup, completed booting, is fully operational/functional, etc. When the secondary side controller 102 has completed starting up, the secondary side controller 102 may control the duty cycle for the primary FET 116. The startup controller 160 may stop increasing or modifying the duty cycle of the primary FET 116 because the secondary side controller may now control the duty cycle of the primary FET 116.

In some embodiments, the startup controller 160 may set the duty cycle of the primary FET 116 based on the pulse signal 138 (e.g., a control signal) received from the secondary side controller 102. For example, the pulse signal 138 may be a waveform or other signal that indicates when the primary FET 116 should be turned on and when the primary FET 116 should be turned off. The startup controller 160 may turn the primary FET 116 on and off based on the pulse signal 138.

In one embodiment, the startup controller 160 (and/or the primary side controller 150) may determine whether a voltage of the AC-DC converter 100 is below an undervoltage threshold (UV). The undervoltage threshold may be the minimum voltage for operating the primary side controller 150 (e.g., the minimum voltage that allows the primary side controller 120 to continue startup and/or operation). For example, the undervoltage threshold may be 5V, 10V, 90V, or some other appropriate threshold voltage. In some embodiments, the startup controller 160 may continually, periodically, etc., determine whether the voltage of the AC-DC converter 100 is below the undervoltage threshold. For example, the startup controller 150 may determine whether the voltage of the AC-DC converter 100 is below the undervoltage threshold every 10 ms, 20 ms, etc. The startup controller 160 may use HV pin 173 to monitor the voltage of the AC-DC converter 100. In other embodiment, the act of sensing rectified AC voltage to be below undervoltage threshold and stop switching is known as Brownout Protection.

In one embodiment, the startup controller 160 (and/or the primary side controller 150) may determine the state of the duty cycle of the primary FET 116 if the voltage of the AC-DC converter 100 is below the undervoltage threshold. For example, the startup controller 160 can analyze the duty cycle of the primary FET 116 to determine the current duty cycle. In another example, startup controller 160 may store the duty cycle for the primary FET 116 each time the startup controller 160 updates or increase the duty cycle. For example, if the startup controller 160 increases the duty cycle from 5% to 10%, then the current duty cycle would be 10%. The startup controller 160 may store some data or value indicating the 10% in a buffer, memory, cache, register, etc.

In one embodiment, the startup controller 160 (and/or the primary side controller 150) may also turn off the primary FET 116 if the voltage of the AC-DC converter 100 is below the undervoltage threshold. For example, the startup controller 160 may turn off the primary FET 116 to stop the flow of energy (e.g., the AC-DC current) to the secondary side controller 102 because the voltage is below the threshold at HV pin 173. If the AC-DC converter 100 was allowed to switch, then the supply voltage on pin 174 would drop below threshold and may cause the primary side controller 150 to reset.

In one embodiment, the startup controller 160 (and/or the primary side controller 150) may determine if the voltage of the AC-DC converter 100 has increased to more than or equal to the undervoltage threshold. For example, the startup controller 160 may constantly, continually, periodically, etc., monitor the voltage of the AD-CD current, as discussed above. This may allow the startup controller 160 to determine if the voltage has increased to more than or equal to the undervoltage threshold.

In one embodiment, the startup controller 160 may turn on the primary FET 116 at the last saved duty cycle when the AC voltage of the AC-DC converter 100 has increased to more than or equal to the undervoltage threshold. As discussed above, when the voltage of the AC-DC converter 100 goes below the undervoltage threshold, the startup controller 160 may store the current duty cycle of the primary FET 116 at the time when the voltage of the AC-DC converter 100 went below the undervoltage threshold (e.g., stores the current duty cycle). The startup controller 160 may turn on the primary FET if the AC voltage of the AC-DC converter 100 increases to more than or equal to the voltage threshold, at that last duty cycle (e.g., at the current duty cycle that was previously stored).

In one embodiment, the startup controller 160 (and/or the primary side controller 150) may determine whether the voltage of the AC-DC converter 100 is less than an undervoltage threshold for a period of time. For example, the primary side controller 150 may determine if the rectified AC voltage of the AC-DC converter 100 is lower than 90V, or some other appropriate voltage, for more than 60 ms, 100 ms, 120 ms, etc. If the AC voltage of the AC-DC converter 100 is lower than the undervoltage threshold for the period of time, the startup controller may cause the discharge circuit 159 to discharge the capacitor 133. This will prevent injury to users of the AC-DC converter 100. The startup controller 160 may use HV pin 173 to monitor the voltage of the AC-DC converter 100.

In one embodiment, the startup controller 160 (and/or the primary side controller 150) may determine whether the voltage of the AC-DC converter 100 is greater than a overvoltage threshold. For example, the overvoltage threshold (OV) may be 400V, 500V, or some other appropriate voltage. If the voltage of the AC-DC converter 100 is greater than the overvoltage threshold, the startup controller will shut down, turn off, disable, etc., the primary FET 116. This may also prevent damage to the power stage components like 110, 112, and RSENSE.

In one embodiment, the startup controller 160 may stop determining whether the voltage of the AC-DC converter 100 is greater than the overvoltage threshold after the pulse signals 138 is received from the secondary side controller 102. For example, after the secondary side controller 102 has started (e.g., started operation, started up, booted, etc.), the startup controller 160 may stop monitoring the voltage of the AC-DC converter 100 and may stop determining whether the voltage of the AC-DC converter 100 is greater than the overvoltage threshold.

Figure 2:
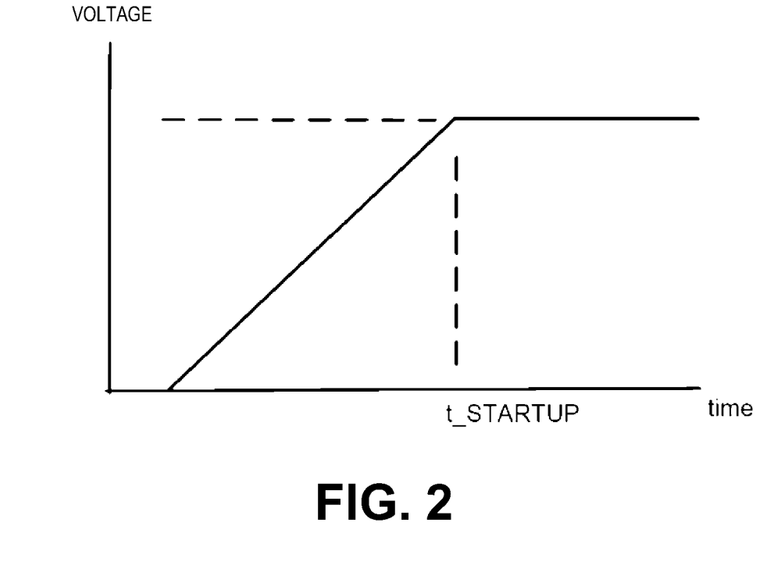
FIG. 2 is a graph illustrating an ideal startup voltage (V_REG) at an soft start pin (SS) according to one embodiment.

FIG. 2 is a graph illustrating an ideal startup voltage for V_REG at the SS pin 138 according to one embodiment. The soft startup means the voltage at the SS pin 138 slowly ramps up until hitting V_REG, which is maintained there-after. After startup, including receipt of turn-on pulses from a secondary side controller 150 via the PULSEIN pin, the primary side controller 150 can instead be powered via the pin 174 by the transformer 104.

Figure 3:
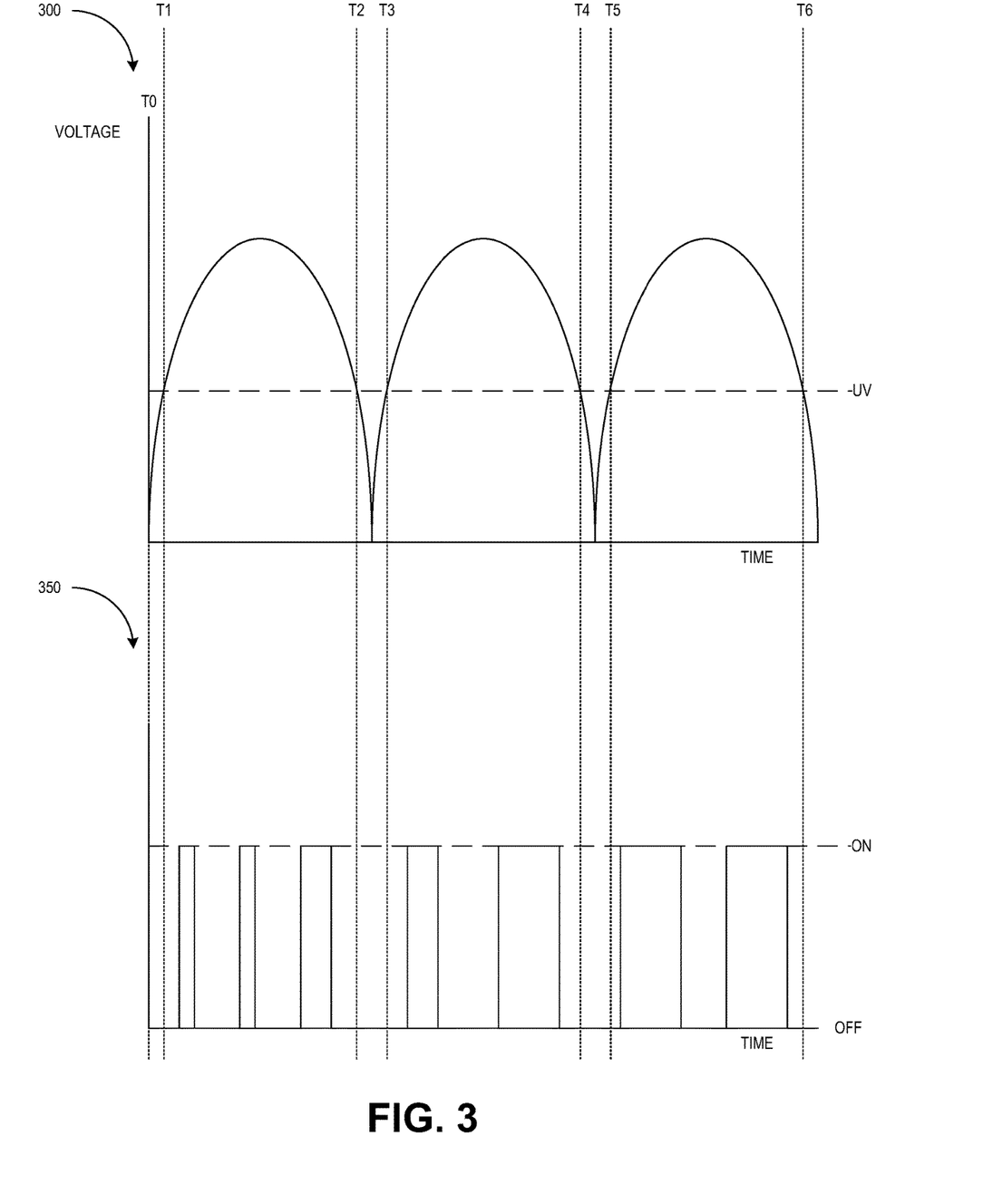
FIG. 3 a first graph illustrating a voltage over time and a second graph illustrating a duty cycle over time according to one embodiment.

FIG. 3 a first graph 300 illustrating a voltage over time and a second graph 350 illustrating a duty cycle over time according to one embodiment. In graph 300, the X-axis represents time and the Y-axis represents the rectified AC voltage of an AC-DC converter that is received by a primary side controller (e.g., primary side controller 150 illustrated in FIG. 1). 0V (e.g., zero volts) and undervoltage threshold (UV) are indicated on the graph 300. Thus, graph 300 illustrates different voltages (e.g., rectified AC voltages) of an AC-DC converter (that provides a current during startup) at different points in time. In graph 350, the X-axis represents time and the Y-axis represents whether a FET (such as primary FET 116 illustrated in FIG. 1) is on or off. Thus, graph 350 illustrates different duty cycles of the FET at different points in time.

As illustrated, from time period T1-T2, the voltage is above the UV (e.g., an undervoltage threshold). During the time period T1-T2, the FET (e.g., switch) is operated at a first duty cycle and transitions to a second duty cycle that is larger than the first duty cycle (as indicated by the wider pulse). For example, the duty cycle may be periodically increased, as discussed above. At time period T2-T3, the voltage drops below undervoltage threshold and the FET is turned off. At time period T3-T4, the voltage goes above UV and the switch resumes operation at the second duty cycle. The FET is also transitioned to a third duty cycle at time period T3-T4. The third duty cycle is larger than the second duty cycle and the first duty cycle (as indicated by the wider pulse). At time period T4-T5, the voltage drops below UV and the FET is turned off. At time period T5-T6, the voltage goes above UV and the switch resumes operation at the third duty cycle. The duty cycle of the FET may be increased until control signals are received from the secondary side controller, as discussed above. The duty cycle of the FET may be increased until it hit the maximum duty and does an auto-restart (not illustrated)

Figure 4:
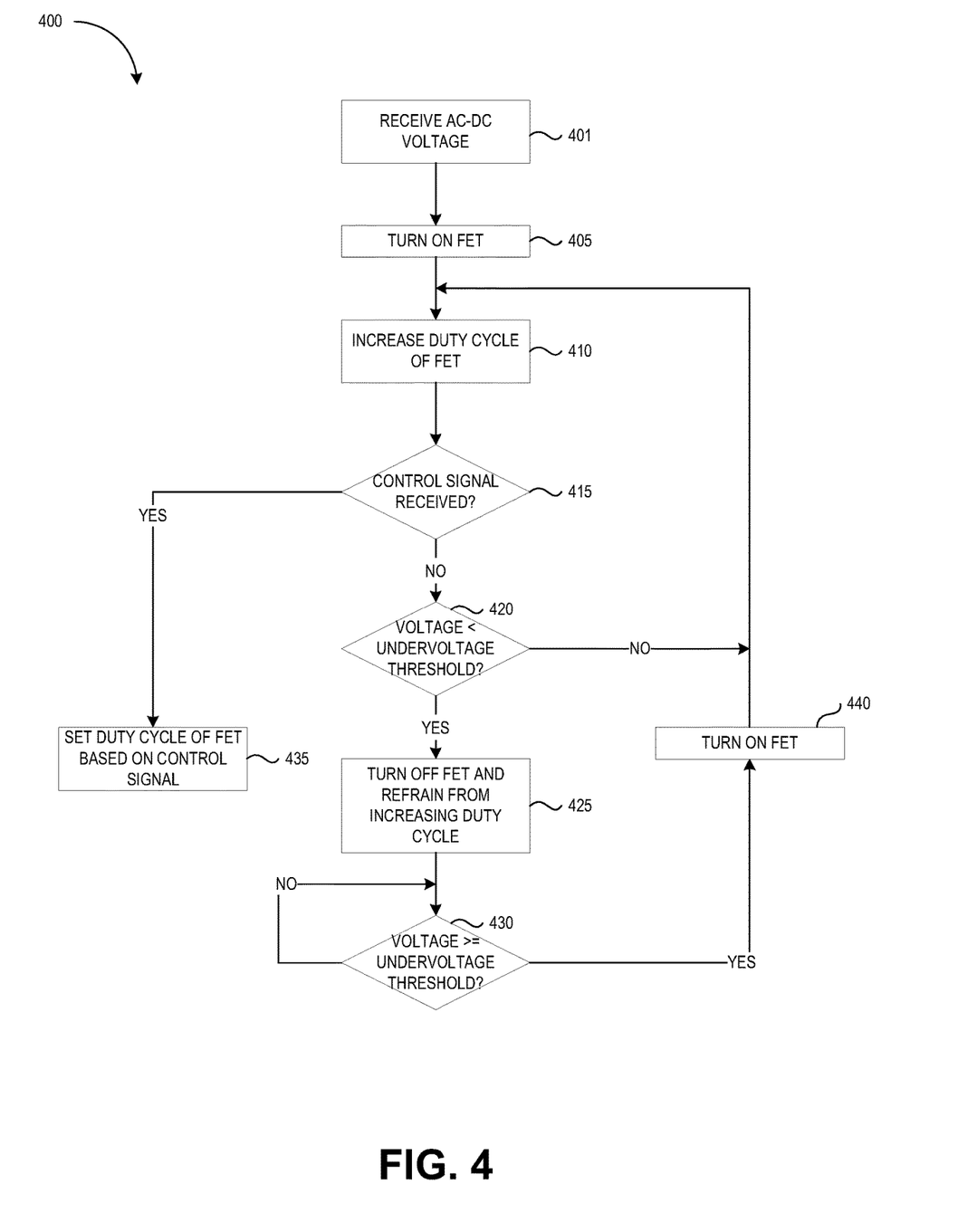
FIG. 4 is a flow diagram of a method of operating an AC-DC converter that includes a primary side controller according to one embodiment.

FIG. 4 is a flow diagram of a method 400 of operating an AC-DC converter that includes a primary side controller according to one embodiment. The method 400 can be performed by processing logic that comprises hardware (e.g., circuitry, dedicated logic, programmable logic, microcode, etc.), firmware, or a combination thereof. In one example embodiment, the method 400 is performed by processing logic included in primary side controller 150 (and/or in startup controller 160 therein) of the AC-DC controller 100.

The method 400 begins at block 401 where voltage, such as a rectified AC voltage, is received. For example, the AC-DC voltage may be received from a AC input. At block 405, a FET (e.g., primary FET 116 illustrated in FIG. 1) is turned on in response to receiving the AC-DC voltage at pin 173. For example, the FET (or switch) may be turned on when the voltage exceeds an undervoltage threshold, as discussed above. The duty cycle of the FET may be set to an initial duty cycle. At block 410, the duty cycle of the FET is increased. For example, the duty cycle may be increased by a set amount. At block 415, the primary side controller determines whether a control signal has been received. For example, the primary side controller may determine whether a control signal has been received from a secondary side controller (e.g., secondary side controller 102 illustrated in FIG. 1). If the control signal has been received, the primary side controller may set the duty cycle of the FET based on the control signal. For example, the control signal may indicate when to turn on the FET and when to turn off the FET and the method 400 may turn the FET on and off based on the control signal.

If the control signal has not been received, the primary side controller may determine if the voltage of the AC-DC converter is less than an undervoltage threshold. If the voltage is not less than the undervoltage threshold, the primary side controller may increase the duty cycle of the FET at block 410. If the voltage of the AC-DC converter is less than the undervoltage threshold, the primary side controller may turn off the FET and refrain from increasing the duty cycle at block 425. The primary side controller may also store the current duty cycle so that the current duty cycle may be used when the FET is turned back on.

At block 430, the primary side controller may determine if the voltage is greater than or equal to the undervoltage threshold. For example, the primary side controller may determine if the voltage has increased up to or more than the undervoltage threshold. If the voltage is not greater than or equal to the undervoltage threshold, the primary side controller may proceed back to block 430. If the voltage is greater than or equal to the undervoltage threshold, the primary side controller may turn on the FET at block 440. As discussed above, the duty cycle of the FET may be set to the last duty cycle that was stored, recorded, etc., at block 425.

In the above description, some portions of the detailed description are presented in terms of algorithms and symbolic representations of operations on analog signals and/or digital signals or data bits within a non-transitory storage medium. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "communicating," "modifying," "measuring," "determining," "detecting," "sending," "comparing," "maintaining," "switching," "controlling," or the like, refer to the actions and processes of an integrated circuit (IC) controller, or similar electronic device, that manipulates and transforms data represented as physical (e.g., electronic) quantities within the controller's registers and memories into other data similarly represented as physical quantities within the controller memories or registers or other such information non-transitory storage medium.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus (e.g., such as an AC-DC converter) for performing the operations herein. This apparatus may be specially constructed for the required purposes, or it may comprise firmware or hardware logic selectively activated or reconfigured by the apparatus. Such firmware may be stored in a non-transitory computer-readable storage medium, such as, but not limited to, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
  receiving, at a primary side controller in an alternating current to direct current (AC-DC) converter, a rectified AC voltage through a pair of diodes, wherein the primary side controller is coupled to a discharge circuit and the discharge circuit is configured to discharge an external capacitor based on an undervoltage threshold;
  determining, by the primary side controller, whether a control signal has been received from a secondary side controller, wherein the primary side controller is on a primary side of a transformer and the secondary side controller is on a secondary side of the transformer;
  in response to determining that the control signal has not been received, increasing, by the primary side controller, a duty cycle of a primary field effect transistor (FET) that is coupled to the transformer;
  determining, by the primary side controller, whether the rectified AC voltage of the AC-DC converter is below the undervoltage threshold;
  in response to determining that the rectified AC voltage of the AC-DC converter is below the undervoltage threshold:
    determining, by the primary side controller, a current duty cycle of the primary FET; and
    turning off, by the primary side controller, the primary FET.

2. The method of claim 1, further comprising:
  determining that the rectified AC voltage of the AC-DC converter has increased to be greater than or equal to the undervoltage threshold;
  turning on the primary FET at the current duty cycle.

3. The method of claim 1, further comprising:
  in response to determining that the control signal has been received, refraining from increasing the duty cycle of the primary FET.

4. The method of claim 1, further comprising:
  in response to determining that the control signal has been received, setting the duty cycle of the primary FET based on the control signal.

5. The method of claim 1, further comprising:
  determining whether the rectified AC voltage of the AC-DC converter is less than the undervoltage threshold for a period of time; and
  in response to determining that the rectified AC voltage of the AC-DC converter is less than the undervoltage threshold for the period of time discharging the external capacitor.

6. The method of claim 1, further comprising:
  determining whether the rectified AC voltage of the AC-DC converter is greater than an overvoltage threshold; and
  in response to determining that the rectified AC voltage of the AC-DC converter is greater than the overvoltage threshold, turning off the primary FET.

7. The method of claim 1, further comprising:
  turning on the primary FET in response to initially receiving the rectified AC voltage, wherein the duty cycle of the primary FET is set to an initial duty cycle.

8. The method of claim 1, wherein the secondary side controller is coupled to a universal serial bus (USB) type-C output connector.

9. An integrated circuit for an alternating current to direct current (AC-DC) converter, the integrated circuit comprising:
  a primary side controller on a primary side of a transformer and configured to receive a rectified alternating current (AC) voltage and coupled to a discharge circuit to discharge an external capacitor based on an undervoltage threshold, the primary side controller comprising:
    a gate driver configured to turn on a primary field effect transistor (FET) that operates at a duty cycle; and
    a startup controller coupled to the gate driver, the startup controller configured to:
      determine whether a control signal has been received from a secondary side controller on a secondary side of the transformer;
      in response to determining that the control signal has not been received, increase the duty cycle of a primary FET;
      determine whether the rectified AC voltage of the AC-DC converter is below the undervoltage threshold;

in response to determining that the voltage of the AC-DC converter is below the undervoltage threshold:
   determine a current duty cycle of the primary FET; and
   turn off the primary FET.

10. The integrated circuit of claim 9, wherein the startup controller is further configured to:
   determine that the rectified AC voltage of the AC-DC converter has increased to be greater than or equal to the undervoltage threshold;
   turn on the primary FET at the current duty cycle.

11. The integrated circuit of claim 9, wherein the startup controller is further configured to:
   in response to determining that the control signal has been received, refrain from increasing the duty cycle of the primary FET.

12. The integrated circuit of claim 9, wherein the startup controller is further configured to:
   in response to determining that the control signal has been received, set the duty cycle of the primary FET based on the control signal.

13. The integrated circuit of claim 9, wherein the startup controller is further configured to:
   determine whether the rectified AC voltage of the AC-DC converter is less than the undervoltage threshold for a period of time; and
   in response to determining that the rectified AC voltage of the AC-DC converter is above the undervoltage threshold for the period of time, discharge the external capacitor.

14. The integrated circuit of claim 9, wherein the startup controller is further configured to:
   determine whether the rectified AC voltage of the AC-DC converter is greater than an overvoltage threshold; and
   in response to determining that the voltage of the AC-DC converter is greater than the overvoltage threshold, turn off the primary FET.

15. The integrated circuit of claim 9, wherein the startup controller is further configured to:
   turn on the primary FET in response to initially receiving the rectified AC voltage, wherein the duty cycle of the primary FET is set to an initial duty cycle.

16. The integrated circuit of claim 9, wherein the AC-DC converter comprises a universal serial bus (USB) type-C output connector.

17. A system, comprising:
   a transformer comprising a primary side and a secondary side;
   a first controller coupled to the secondary side of the transformer;
   a discharge circuit configured to discharge an external capacitor based on an undervoltage threshold; and
   a second controller coupled to the discharge circuit, the second controller coupled to receive a rectified alternating current (AC) voltage on the primary side of the transformer in an AC-DC converter and configured to receive control signals from the first controller, the second controller comprising:
      a gate driver configured to turn on a primary field effect transistor (FET) that operates at a duty cycle; and
      a startup controller coupled to the gate driver, the startup controller configured to:
         determine whether a control signal has been received from the first controller;
         in response to determining that the control signal has not been received, increase the duty cycle of the primary FET;
         determine whether a voltage of the AC-DC converter is below the undervoltage threshold;
         in response to determining that the voltage of the AC-DC converter is below the undervoltage threshold:
            determine a current duty cycle of the primary FET; and
            turn off the primary FET.

18. The system of claim 17, wherein the startup controller is further configured to:
   determine that the voltage of the AC-DC converter has increased to be greater than or equal to the undervoltage threshold;
   turn on the primary FET at the current duty cycle.

19. The system of claim 17, wherein the startup controller is further configured to:
   in response to determining that the control signal has been received, refrain from increasing the duty cycle of the primary FET.

20. The system of claim 17, further comprising a universal serial bus (USB) type-C output connector coupled to the first controller.

* * * * *